United States Patent [19]

Boyajian et al.

[11] 3,971,131
[45] July 27, 1976

[54] STRAIGHT PATTERN SNIPS

[75] Inventors: Alfred Z. Boyajian, Manhattan Beach, Calif.; Jules M. Don, Naugatuck, Conn.

[73] Assignee: The Stanley Works, New Britain, Conn.

[22] Filed: May 27, 1975

[21] Appl. No.: 580,674

[52] U.S. Cl. .................................. 30/260; 30/266
[51] Int. Cl.² ...................................... B26B 13/04
[58] Field of Search ............. 30/254, 260, 266, 270

[56] References Cited
UNITED STATES PATENTS

| | | | |
|---|---|---|---|
| 94,247 | 8/1869 | Seymour | 30/266 |
| 743,658 | 11/1903 | Polowski | 30/260 |
| 1,470,417 | 10/1923 | Wintle | 30/260 |
| 1,696,323 | 12/1928 | Patrick | 30/266 X |
| 2,801,468 | 8/1957 | Anderson | 30/254 |
| 3,052,026 | 9/1962 | Muller | 30/260 X |

FOREIGN PATENTS OR APPLICATIONS 249,065  6/1947  Switzerland ........................ 30/270

*Primary Examiner*—Al Lawrence Smith
*Assistant Examiner*—J. C. Peters

[57] ABSTRACT

A pair of straight pattern snips is provided which is designed to be employed for performing a cutting operation on an article. The snips consist of a pair of integral members, one having a left-hand configuration and the other a right-hand configuration. The pair of members are operatively connected together by means of a pivot bolt so as to be capable of pivotal movement relative to each other. Each of the members includes a handle formed at one end thereof and a jaw at the other end thereof. The grips, i.e., ears with which the handles are provided are skewed or rotated from the plane of the handles to provide a more comfortable grip or hold of the snips for the user. The snips are further provided with detachable blades. The latter blades are mounted on the jaws in blade pockets, i.e., recesses formed in the latter jaws for this purpose through the use of conventional fasteners. The working load is transferred from the blade to the jaw through contact of the back of the blade with a projection or ledge which defines one side of the aforementioned blade pocket with which each jaw is provided. The blade set, i.e., the wiping action of the blade is obtained by inclining the blade pad surface of the jaw which forms the bottom of the blade pocket. By virtue of the aforedescribed inclined angular disposition of the blade, contact between the blades of the snips as the latter is moved to its closed, i.e., cutting position takes place from the outer end, i.e., the tip of the blades to the inner ends thereof.

8 Claims, 10 Drawing Figures

STRAIGHT PATTERN SNIPS

BACKGROUND OF THE INVENTION

It has long been known heretofore to employ hand shears of the type conventionally referred to by those skilled in the art as snips for purposes of cutting through a piece of material such as sheet metal. Although the function of all snips may be the same, it is commonly found that prior art forms of snips often times differ from each other in one regard or another. More specifically, it is most often found that when differences exist between prior art forms of snips such differences generally are of a structural nature which affects the operating characteristics of the snips rather than constituting merely differences in appearance.

For example, essentially all of the snips which have been provided heretodate in the prior art have consisted of a pair of members which are operatively connected generally at their midpoints for pivotal movement between an open and a closed position relative to each other. However, from the standpoint of their constructions, variations are often found to exist between the members of one pair of snips and the members of another pair of snips. Namely, although each of the members is provided conventionally with a handle portion formed at one end thereof and has a jaw portion provided at the other end thereof, changes have been made in the nature of the construction of these members down through the years. One form of change which has occurred resides in the nature of the material from which the members are formed.

Another structural difference probably of a more significant nature than that referred to in the preceding paragraph which serves to distinguish one embodiment of snips from another resides in the nature of the construction of the handle portions of the members. Commonly, the handle portion of each member is provided with a grip, i.e., ear which takes the form of an opening generally oval in configuration which is suitably dimensioned so as to be capable of receiving therein one or more of the fingers of the user. In order to provide the user with a comfortable hold or grip when employing the snips, attempts have been made, as is readily apparent from a reference to the prior art, to vary the configuration, the relative size and shape of the handle portions and/or the relative size, shape and location of the ears formed in the handle portions so as to come up with a configuration which would provide a comfortable hold or grip to the user while at the same time still ensuring that the desired leverage is provided to enable the snips to perform their intended function with a high degree of efficiency. Also, it has been known in this connection in the prior art to skew, i.e., rotate one of the ears out of the major plane of the handle portion for the same aforedescribed purpose.

Yet another structural difference which serves to distinguish some prior art snips one from another resides in the fact that in some instances the blades with which the jaw portions of the snips are provided are formed integrally therewith whereas in other instances detachable blades are employed. In this connection, certain advantages inherently flow from the use of detachable blades. More particularly, if detachable blades are employed, the material from which the blades are formed may be chosen based solely on the consideration of how well such material will function as a cutting means. Likewise, each of the members of the pair of snips may be made from a material which lends itself to being shaped by means of a facile and economical manufacturing process without concern being given as to how such material may be provided with an integral cutting surface. Finally, when the cutting edge of the blades becomes worn through use, it is easier in many instances to replace the blades entirely, which is possible when detachable blades are employed, rather than having to renew the cutting surfaces of the blades through sharpening, etc. which is required when the blades are formed as a integral part of the jaw portions of the members which comprise a pair of snips.

Another area in the construction of snips to which some attention has been directed by the prior art in an attempt to improve the operating characteristics of a pair of snips relates to the manner in which the blades are positioned relative to each other. The latter positioning of the blades obviously affects the way in which the blades meet as the members which comprise a pair of snips are moved to their closed, i.e., cutting position. The reason for this attention is that through such changes improvements have been sought in the cutting action capable of being provided by prior art forms of snips.

Notwithstanding the fact that a large number of snips have been provided heretofore in the prior art embodying differing forms of construction, there has nevertheless still existed a need to make further improvements therein. More specifically, although a number of improvements have been made in the construction of snips as exemplified by the prior art snips to which reference was had hereinabove, such improvements have been limited heretofore solely to only one area or at most two areas of the construction of the snips. Consequently, a need has existed to provide a pair of snips characterized by the fact that a multiplicity of improvements have been made in the overall construction thereof whereby to provide a pair of snips which embodies a construction from which optimal performance is capable of being derived.

Accordingly, it is an object of the present invention to provide a novel and improved construction for a pair of straight pattern snips operable for cutting a piece of material such as sheet metal.

It is another object of the present invention to provide such a pair of straight pattern snips wherein the ears formed in the handle portions thereof are skewed, i.e., rotated out of the major plane of the handle portions to provide a comfortable hand grip for the user while employing the snips.

A further object of the present invention is to provide such a pair of straight pattern snips providing a comfortable hand hold for a user and which is further advantageously characterized by the fact that the blades thereof are detachably mounted thereon.

A still further object of the present invention is to provide such a pair of straight pattern snips which besides possessing the capability of providing a comfortable grip and embodying detachable blades is moreover advantageously characterized by the fact that the blades are inclined towards each other whereby to provide the snips with a more effective and efficient cutting action.

Yet another object of the present invention is to provide such a pair of straight pattern snips which embodies a construction which is capable of being easily and economically manufactured, while yet possessing a relatively long and trouble-free operating life.

SUMMARY OF THE INVENTION

It has now been found that the foregoing and related objects can be readily attained in a pair of straight pattern snips embodying a novel and improved construction, and which is particularly adapted for cutting through a piece of material such as sheet metal. The snips consist of a pair of integral members, one having a left-hand configuration and the other a right-hand configuration. The pair of members are operatively connected together by means of a pivot bolt so as to be capable of pivotal movement relative to each other thereby enabling the members to move between cutting and non-cutting positions. Each of the members includes a handle portion formed at one end thereof and a jaw portion formed at the other end thereof. Moreover, the handle portions are provided with grip means configured so as to afford a comfortable hold, i.e., grip to the user when utilizing the snips. Blade means are detachably fastened to the jaw portions. The working load during the cutting action is transferred from the blade means to the jaw portions. In addition, the blade means are disposed on the jaw portions so that the wiping action of the former is obtained by inclining the blade means relative to the major plane of the jaw portions of the snips.

In accord with the preferred embodiment of the invention, each of the two members which when operatively connected together function to form a pair of snips are made of die cast aluminum. The grip means with which the handle portions are each provided includes an ear formed in the handle portion so as to be skewed, i.e., rotated out of the major plane of the body of handle portion. By being so constructed the ears provide a comfortable hand hold, i.e., grip for the fingers of the user. The blade means with which the snips is provided comprises a pair of detachable blade members fastened to the jaw portions through the use of conventional threaded fasteners. By virtue of the fact that the blade members are detachable, it is feasible to form the blade members of a material which differs from that utilized to form the two members of the snips. To receive the blade members, each of the jaw portions has formed therein a blade pocket. The latter pocket consists of a recess including a bottom surface, at least one elongated side wall, i.e., shoulder or ledge, and an end wall. When the blade member is received in the aforedescribed blade pocket, the non-cutting edge of the blade means is positioned in abutting engagement with the aforementioned elongated side wall of the blade pocket. The working load present when a cutting operation is being performed with the snips is transferred from the blade member to the jaw portion through the non-cutting edge of the blade member which is in engagement with the elongated side wall of the jaw portion. Also, the bottom surface of the blade pocket is formed so as to have an inclination measured from one end thereof to the other. Consequently, when the blade member is received in the blade pocket, the former is inclined relative to the major plane of the jaw portion. It is from this inclined of the blade member that the blade set, i.e., wiping action of the blade member is obtained.

DETAILED DESCRIPTION OF THE ILLUSTRATED EMBODIMENT

Figure 1:
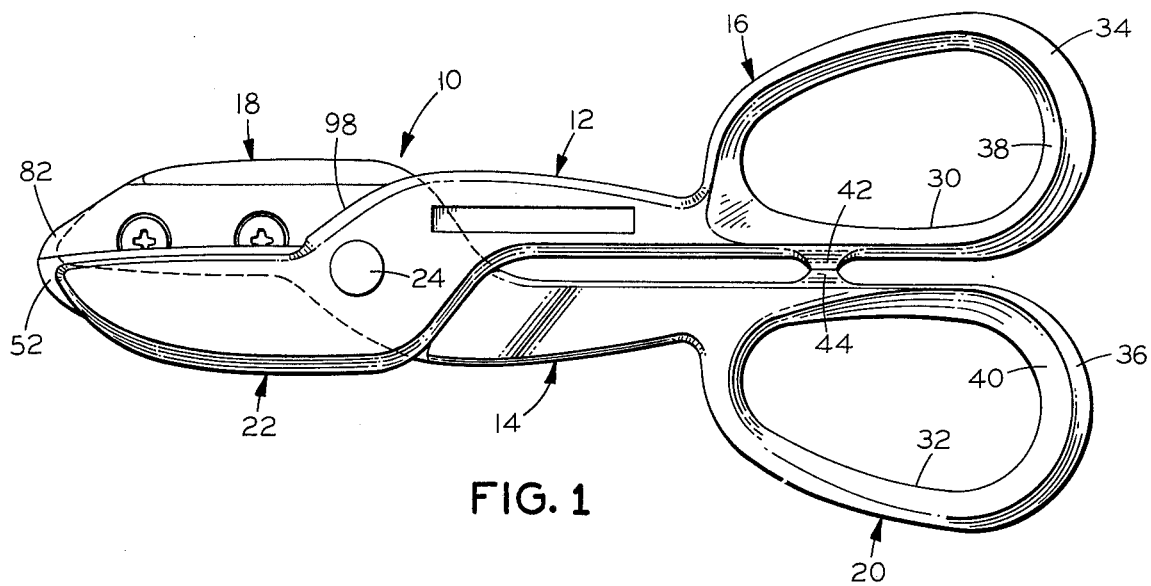
FIG. 1 is a top plan view of a pair of straight pattern snips constructed in accordance with the present invention.

Referring now to the drawings and more particularly FIG. 1 thereof, there is illustrated therein a pair of straight pattern snips, generally designated by reference numeral 10, constructed in accordance with the present invention, and which is particularly adapted to be utilized for cutting through a piece of material such as sheet metal. The snips 10 include a pair of integrally formed members designated by the reference numerals 12 and 14, respectively, in the drawings. In accord with the preferred embodiment of the invention, the members 12 and 14 are die cast from aluminum, and the member 12 is provided with a left-hand configuration while the member 14 is provided with a right-hand configuration. Apart from the fact that the member 12 has a left-hand configuration while the member 14 has a right-hand configuration, the construction of each of the members 12 and 14 is substantially identical.

Figure 2:
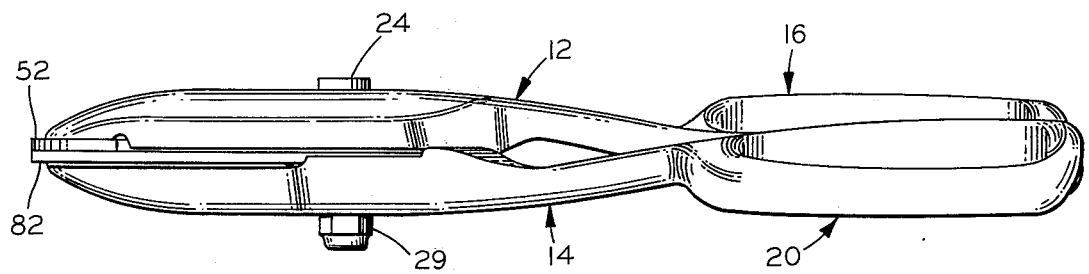
FIG. 2 is a side elevational view of a pair of straight pattern snips constructed in accordance with the present invention.
Figure 3:
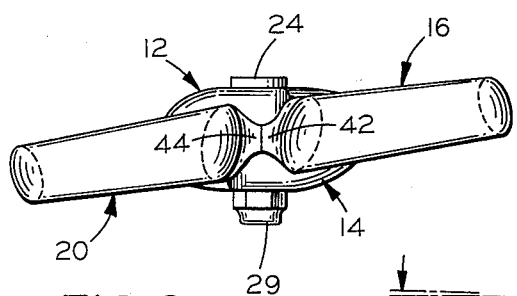
FIG. 3 is an end view of a pair of straight pattern snips constructed in accordance with the present invention.

Proceeding now with a detailed description of the nature of the construction of the members 12 and 14, reference will be had for this purpose again to FIG. 1 of the drawings. As illustrated therein, the member 12 includes a handle portion 16 formed at one end thereof and has a jaw portion 22 provided at the other end thereof. In similar fashion, the member 14 has a jaw portion 18 formed at one end thereof and a handle portion 20 provided at the other end thereof. In order to form the pair of snips 10, the members 12 and 14 are operatively connected together substantially at their midpoints in such a manner as to permit pivotal movement therebetween whereby the members 12 and 14 are capable of occupying a cutting and a non-cutting position relative to each other. More specifically, the assembly of the members 12 and 14 is accomplished through the use of the pivot bolt 24. The latter bolt 24 which has an enlarged head 24a, a rectangularly configured intermediate body portion 24b, and a threaded tip 24c is suitably dimensioned so as to be capable of being passed through a circular hole 26 formed for this purpose in the member 12 and a rectangular opening 28 provided therefor in the member 14. When the bolt 24 is so received in the hole 26 and opening 28, the rectangular shaped intermediate body portion 24b of the bolt 24 is positioned within the rectangular opening 28. Consequently, as should be readily apparent to all, the coaction between the portion 24b of the bolt 24 and the side walls which define the opening 28 is such as to limit the bolt 24 to only axial movement within the opening 28. For purposes of maintaining the pivot bolt 24 positioned within the hole 26 and the opening 28, a nut 29 is preferably threadedly engaged on the threaded tip 24c of the bolt 24, as best seen with reference to FIGS. 2 and 3 of the drawings.

Continuing now with a description of the construction of the members 12 and 14, and more particularly the handle portions 16 and 20, respectively, thereof, as shown in FIG. 1 of the drawings, the handle portions 16 and 20 are each provided with a grip, i.e., ear 34 and 36, respectively. The ears 34 and 36 each consist of a generally oval opening 30 and 32, respectively, suitably formed in the handle portion 16 and the handle portion 20, respectively. In accord with the illustrated embodiment of the invention, the dimensions of the ears 34 and 36 are substantially identical. As shown in FIG. 1 of the drawings, the portions 38 and 40 surrounding the opening 30 and 32, respectively, are each preferably tapered so that the thickness thereof measured at the outermost diameter thereof is greater than the thickness thereof measured adjacent to the rim of the corresponding opening 30 or 32. Moreover, it is to be understood that the portions 38 and 40 are formed so as to present a smooth gripping surface whereby to obviate the possibility of any injury being caused thereby to the fingers of a user when the user's fingers are inserted through the opening 30 and 32 for purposes of gripping the snips 10 to permit the use thereof. As best understood with reference to FIG. 3 of the drawings, the ears 34 and 36 of the handle portions 16 and 20, respectively, are each skewed, i.e., rotated so as to be inclined slightly relative to the major plane of the body of the handle portions 16 and 20. Moreover, it will be seen with reference to FIG. 3 that the ears 34 and 36 are both rotated in the same direction relative to the major plane of the handle portions 16 and 20, namely counterclockwise about the major axis of the snips 10 when viewing along the aforesaid major axis from the handle end of the snips 10. By being so skewed, a comfortable hand hold or grip is provided by the handle portions 16 and 20, and more particularly the ears 34 and 36 thereof for the user while utilizing the snips 10 for cutting through a piece of material such as sheet metal. Completing the description of the handle portions 16 and 20, it will be seen in FIG. 1 of the drawings that the handle portions 16 and 20 are each provided with a projection 42 and 44, respectively, formed integrally therewith and spaced inwardly from the ends thereof. More specifically, the projections 42 and 44 are suitably located so that when the members 12 and 14 pivot about the pivot bolt 24, the projections 42 and 44 are brought into engagement with each other in the manner depicted in FIG. 1 of the drawings. Accordingly, it should be readily apparent from the foregoing that the projections 42 and 44 function as stops limiting the extent to which the members 12 and 14 are permitted to pivot relative to each other.

Figure 4:
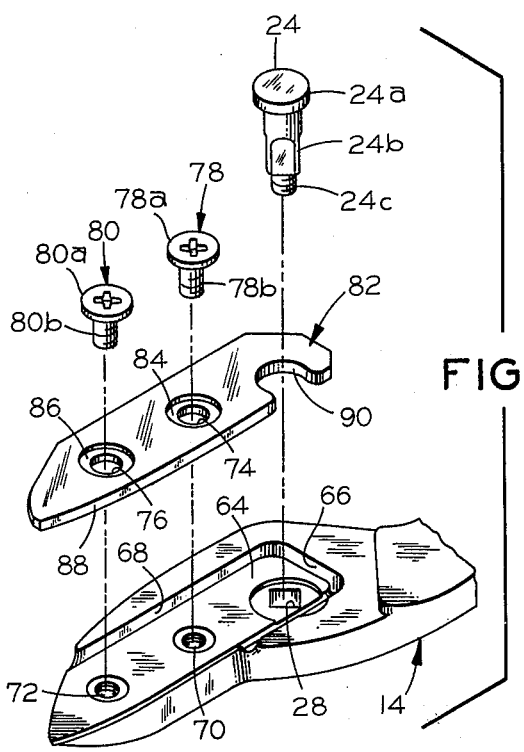
FIG. 4 is an exploded perspective view of the jaw portion of one of the two members which when in the assembled condition function to comprise a pair of straight pattern snips constructed in accordance with the present invention.
Figure 5:
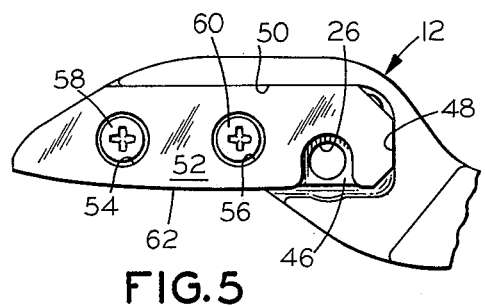
FIG. 5 is a top plan view of the jaw portion of one of the two members which when in the assembled condition function to comprise a pair of straight pattern snips constructed in accordance with the present invention.
Figure 6:
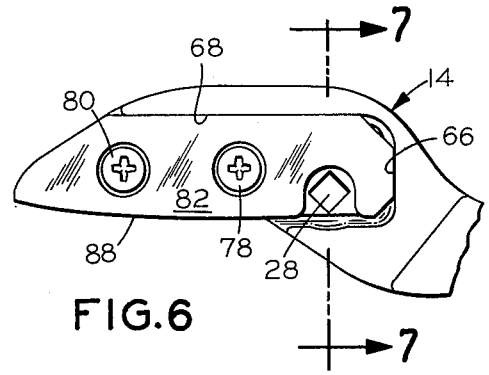
FIG. 6 is a top plan view similar to FIG. 5 of the jaw portion of the other of the two members which when in the assembled condition function to comprise a pair of straight pattern snips constructed in accordance with the present invention.

Turning now to a description of the details of construction of the jaw portions 18 and 22 of the members 14 and 12, respectively, reference will be had for this purpose in particular to FIGS. 4, 5 and 6 of the drawings. Considering first the nature of the construction of the jaw portion 22, as understood with reference to FIG. 5 of the drawings, the jaw portion 22 has formed therein adjacent the end thereof, a blade pad or pocket 46. The latter comprises a recess which is provided in the jaw portion 22 and which is defined by a bottom surface which is not visible in the drawings, an end wall 48, and an elongated side wall 50, the latter being in the nature of a shoulder or ledge. A blade 52 is provided suitably dimensioned so as to be receivable within the blade pocket 46. For purposes of retaining the blade 52 properly positioned within the blade pocket 46, any suitable conventional type of fastening means may be utilized. In this connection, in accord with the illustrated embodiment of the invention a pair of threaded fasteners 58 and 60 are employed. The latter fasteners 58 and 60 are received in a pair of spaced counterbored openings 54 and 56 which are formed for this purpose in the blade 52. More particularly, the threaded fasteners 58 and 60 are passed through the openings 54 and 56, respectively, into threaded engagement with the threads of a pair of threaded openings (not shown) which are provided in the blade pocket 46 so as to be aligned with the openings 54 and 56 in the blade 52 when the latter is positioned within the blade pocket 46. Each of the openings 54 and 56 is preferably counterbored so as to provide a recess for receiving therein the head of the threaded fasteners 58 and 60, respectively, whereby when the threaded fasteners 58 and 60 are positioned in the openings 54 and 56, respectively, they do not project above the planar surface of the blade 52 but rather present a level surface therewith. As best understood with reference to FIG. 5 of the drawings when the blade 52 is mounted in the blade pocket 46, the cutting edge 62 of the former is disposed outwardly of the jaw portion 22 so as to be exposed whereby to be engageable with the piece of material to be cut. Moreover, it will be noted with reference to FIG. 5 of the drawings that when the blade 52 is so mounted in the blade pocket 46 of the jaw portion 22, the noncutting edge of the blade 52, i.e., the edge thereof located opposite the cutting edge 62 abuts against the elongated side wall 50, i.e., the shoulder or ledge which functions to define one side of the blade pocket 46, for a purpose yet to be described. Completing the description of the blade 52, the latter is preferably provided with a cutout 90 which functions to provide clearance for the pivot bolt 24 extending through the jaw portion 22.

Considering next the nature of the construction of the jaw portion 18, reference will be had for this purpose to FIGS. 4 and 6 of the drawings. It will be readily apparent from a comparison of the structure shown in FIGS. 4 and 6 with that depicted in FIG. 5 and described in the preceding paragraph that the jaw portion 18 is substantially identical in construction to the jaw portion 22 except that one is intended to constitute a portion of a member having a left-hand configuration while the other is intended to constitute a portion of a member having a right-hand configuration. More particularly, as illustrated in FIG. 4 of the drawings the jaw portion 18 has a blade pocket 64 formed therein adjacent one end thereof. The blade pocket 64 comprises a recess which is provided in the jaw pocket 18 and which is defined by a bottom surface, an end wall 66 and an elongated side wall 68, the latter being in the nature of a shoulder or ledge. A blade 82 is provided suitably dimensioned so as to be receivable within the blade pocket 64. For purposes of retaining the blade 82 properly positioned within the blade pocket 64, any suitable conventional type of fastening means may be utilized. In this connection, in accord with the illustrated embodiment of the invention a pair of threaded fasteners 78 and 80, each having an enlarged head portion 78a and 80a, respectively, and a threaded body portion 78b and 80b, respectively, are utilized for this purpose. The latter fasteners 78 and 80 are received in a pair of spaced holes 74 and 76 formed for this purpose in the blade 82. More particularly, the threaded fasteners 78 and 80 are passed through the openings 74 and 76, respectively, into threaded engagement with the threads of a pair of threaded openings 70 and 72, respectively, which are provided in the blade pocket 64 so as to be aligned with the openings 74 and 76 in the blade 82 when the latter is positioned within the blade pocket 64. Each of the openings 74 and 76 is counterbored at 84 and 86, respectively, so as to provide a recess for receiving therein the enlarged head portions 78a and 80a, respectively, of the threaded fasteners 78 and 80, whereby when the latter are positioned in the openings 74 and 76, respectively, they do not project above the planar surface of the blade 82 but rather are flush with the surface thereof. As best understood with reference to FIG. 6 of the drawings, when the blade 82 is mounted in the blade pocket 64, the cutting edge 88 of the former is disposed, i.e., projects outwardly of the jaw portion 18 so as to be exposed whereby to be engageable with the piece of material to be cut. Moreover, it will be seen with reference to FIG. 6 of the drawings, that when the blade 82 is so mounted in the blade pocket 64 of the jaw portion 18, the noncutting edge of the blade 82, i.e., the edge thereof located opposite the cutting edge 88 abuts against the elongated side wall 68, i.e., the shoulder or ledge which functions to define one side of the blade pocket 64 for a purpose yet to be described. Completing the description of the blade 82, the latter is preferably provided with a cutout 90 which functions to provide clearance for the pivot bolt 24 extending through the jaw portion 18.

Figure 8:
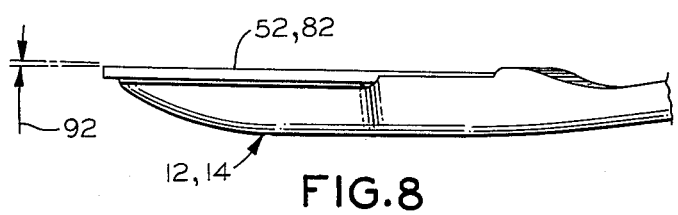
FIG. 8 is a side elevational view of the jaw portion of one of the two members which when in the assembled condition function to comprise a pair of straight pattern snips constructed in accordance with the present invention, illustrating the angular offset of the blade member mounted on the jaw portion.

Referring next to FIG. 8 of the drawings, it will be noted therefrom that the blade set, i.e., the wiping action of the blade is obtained by inclining the bottom surface of the blade pocket. The extent of the incline has been depicted in FIG. 8 for one of the jaw portions, both jaw portions being constructed the same in this respect, by means of the spacing which exists between the arrows designated by the reference numeral 92.

Figure 7:
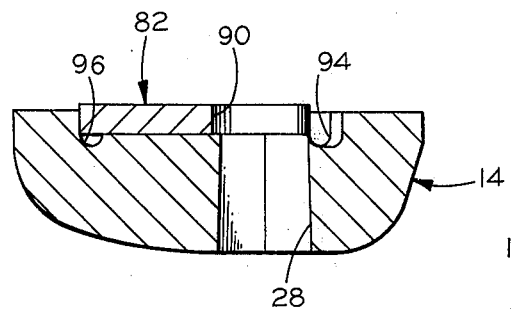
FIG. 7 is a cross sectional view of the jaw portion of one of the two members which when in the assembled condition function to comprise a pair of straight pattern snips constructed in accordance with the present invention, taken substantially along the line 7-7 in FIG. 6.

Finally, note will be taken of the fact that in accord with the illustrated embodiment of the invention and as shown in FIG. 7 of the drawings, the blade pocket 64 is undercut along the edge of each of the side walls which define the two long sides of the blade pocket 64, i.e., at 94 and 96. Although not depicted in the drawings, it is to be understood that the blade pocket 46 is similarly configured. Moreover, it is to be further understood that although a relatively large clearance is depicted in FIG. 7 of the drawings as existing between the edge 88 of the blade 82 and the lower long side of the blade pocket 64, namely, above the undercut 94 in the blade pocket 64, the size of the aforereferenced clearance has been exaggerated in FIG. 7 simply as a means of facilitating the illustration of the nature of the structure appearing therein. More specifically, it should be understood that such a clearance must necessarily exist in the production pieces because of tolerance requirements, but that the actual clearance which exists is relatively small inasmuch as it is desirable that the edge 88 of the blade 82 be substantially in abutting relation with the aforesaid lower long side of the blade pocket 64.

Thus, as set forth hereinabove the snips 10 embody a construction wherein the grips, i.e., ears with which the body of the handle portions are provided are skewed or rotated from the plane of the handle portions to provide a more comfortable grip or hold of the snips 10 for the user. The snips 10 are further provided with detachable blades. The latter blades are mounted on the jaws in blade pockets, i.e., recesses formed in the latter for this purpose through the use of conventional fasteners. The working load is transferred from the blades to the jaw portions through contact of the back of the blade with the shoulder or ledge which defines one side of the aforementioned blade pocket with which each jaw portion is provided. The blade set, i.e., the wiping action of the blade is obtained by inclining the blade pad surface of the jaw portion which forms the bottom surface of the blade pocket.

As is well-known to those familiar with the use of snips, and particularly tin snips, in cutting sheet metal therewith as the snips advance into the latter, the cut edge is pushed out of the way by virtue of the engagement thereof with a portion of the straight pattern snips 10. More specifically, the cut edge of the sheet metal is pushed out of the way by virtue of its engagement with the curvilinear portion of one of the members 12 and 14 which when in the assembled condition comprise the straight pattern snips 10. The curvilinear portion to which reference is had here is the portion of the member 12, best seen in FIG. 1 of the drawings, which has been identified therein through the use of the reference numeral 98. In accord with the illustrated embodiment of the snips 10 as has been described previously hereinabove, the members 12 and 14 are each formed of die cast aluminum. However, inasmuch as aluminum is a relatively soft material, it has been found that the sharp edge of the sheet metal as it rides up on the surface adjacent to the curvilinear portion 98 tends to dig into the aluminum thereby giving rise to two undesirable conditions. First, the effect of the sharp edge of the sheet metal digging into the aluminum is to mar the appearance of the snips by scratching and abrading the aluminum. Secondly, and more seriously, as the sheet metal edge catches in the aluminum and starts to scratch it, it constitutes an annoying and not insignificant retarding force to the progress of the snips through the sheet metal.

Figure 10:
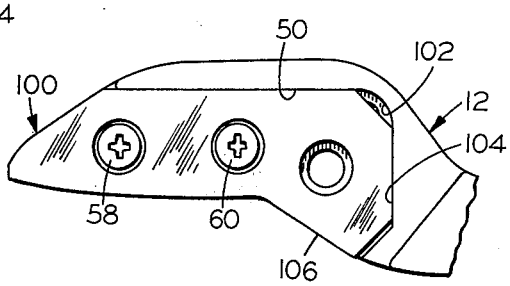
FIG. 10 is a top plan view of the jaw portion of one of the two members which when in the assembled condition function to comprise a pair of straight pattern snips constructed in accordance with the present invention, illustrating the manner in which the blade of FIG. 9 is mounted thereon.
Figure 9:
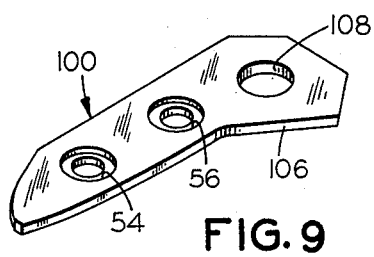
FIG. 9 is a perspective view of another embodiment of a blade capable of being utilized in a pair of straight pattern snips constructed in accordance with the present invention.

Referring now to FIGS. 9 and 10 of the drawings, there is illustrated therein a blade, generally designated by reference numeral 100, embodying a modified construction which has been found to be operable to obviate the problems discussed in the preceding paragraph. Inasmuch as the construction of the blade 100 is generally similar to that of the blade 52, for purposes of ease of understanding those portions of the blade 100 which are the same as those found embodied in the blade 52 have been designated in FIGS. 9 and 10 by the same reference numerals which have been employed in FIG. 5 in conjunction with the illustration of the blade 52 therein. More specifically, the blade 100 is provided with a pair of spaced counterbored openings 54 and 56 which are suitably dimensioned so as to be capable of receiving therein a pair of threaded fasteners 58 and 60, respectively. As depicted in FIG. 10 of the drawings, the latter fasteners 58 and 60 are utilized for purposes of detachably mounting the blade 100 on the jaw portion 22 of the member 12. To this end, the jaw portion 22 is provided with a blade pad or pocket 102 which is generally similar in construction to the pocket 46 in which the blade 52 is received. Accordingly, the same reference numerals have been utilized in both FIGS. 5 and 10 to designate the portions which the pockets 46 and 102 have in common. The pocket 102, like the pocket 46 which has been previously described hereinabove, comprises a recess which is provided in the jaw portion 22 of the member 12 and which is defined by a bottom surface not visible in the drawings, an end wall 104, and an elongated side wall 50, the latter being in the nature of a shoulder or ledge. The difference between the pocket 46 and the pocket 102 resides in the nature of the configuration thereof. More specifically, the pocket 102 is constructed so that the end wall 104 thereof, which corresponds generally to the end wall 48 of the pocket 46, is longer in length than the end wall 48. Namely, the end wall 104 extends from the elongated side wall 50 of the pocket 104 to the curvilinear portion 98 of the member 12. Consequently, as will be understood with reference to FIG. 10, the pocket 104 corresponds in configuration to the shape of the blade 100 to which further reference will now be had.

Considering now the shape of the blade 100 as compared to the blade 52, it will be understood with reference to a comparison of FIGS. 9 and 5, respectively, that the shape of the blade 100 differs from that of the blade 52 in that the blade 100 embodies a curvilinear portion 106 which is not found in the blade 52. As understood with reference to FIGS. 9 and 10, the portion 106 of the blade 100 constitutes a continuation of the blade 100. Moreover, the portion 106 of the blade 100 is suitably dimensioned such that when the blade 100 is mounted in the recess 102, the portion 106 is located in juxtaposed relation to the edge of the curvilinear portion 98 of the jaw portion 22 of the member 12. In this regard, the portion 106 of the blade 100 preferably extends to the edge of the portion 98 so that the former projects slightly outwardly of the edge of the portion 98 or is at least flush therewith. Accordingly, the portion 106 of the blade 100, the latter being made of steel, functions to provide a finely finished steel surface which is operable as a means of guiding the sheet metal as the latter is being cut through the use of the snips 10. Since the edge of the portion 106 of the blade 100 is hardened however, the former will function to push aside the cut edge of the sheet metal. Thus, the sharp edge of the sheet metal will not dig into the portion 106 thereby obviating the problem of marring the appearance of the snips as well as eliminating the existence of the retarding forces. Instead the cut edge of the sheet metal will slide easily over the steel surface of the portion 106 of the blade 100 without dragging.

With further reference to FIGS. 9 and 10 of the drawings, it will be noted that another difference exists between the blades 100 and 52 insofar as concerns the nature of their construction. More specifically, as was described previously hereinabove in the course of the description of the blade 52, the latter has a notch formed therein for purposes of enabling the pivot bolt 24 to be passed therethrough after passing through the hole 26 provided therefor in the member 12. However, rather than utilizing the aforereferenced notch for this purpose, it is also possible without departing from the essence of the invention to provide a circular opening in the blade for this purpose. This is exemplified in FIGS. 9 and 10 of the drawings wherein as depicted therein the blade 100 is provided with an opening 108 extending completely therethrough and suitably dimensioned so as to permit the pivot bolt 24 to pass freely therethrough for purposes of assembling together the members 12 and 14 to form a pair of straight pattern snips 10 constructed in accord with the present invention.

The manner in which the cutting forces in the straight pattern snips 10 are preferably resisted will now be briefly summarized. When the cutting force is located directly under the shear ledge, i.e., the elongated sidewall of the blade pocket abutting the upper non-cutting edge of the blade, the working load as was indicated previously hereinabove is transferred from the blade to the jaw through contact of the non-cutting edge of the blade with the aforesaid elongated sidewall of the blade pocket. However, when the cutting force is located ahead of the upper shear ledge, i.e., near the blade nose, a tipping moment is applied to the blade. For reasons well-known to those skilled in the art, this moment should not be resisted by the friction clamping of the screws. Rather, a balancing force must be provided by the blade pocket, formed in the casting, at the rear end of the blade pocket, and preferably behind the pivot bolt, to resist blade rotation. Thus, a second non-cutting edge of the blade must abut a second shear ledge, or pocket sidewall, on the opposite side from the first sidewall. This provides the means to resist blade rotation. It should also be noted that both the screw holes and the counterbores in the blade should have sufficient clearance relative to the screws, so that the non-cutting edges of the blade can seat against the sidewalls of the blade pocket on the top as well as on the bottom thereof. In addition, it should be further understood that for good tool performance blade movement should be minimized by matching manufacturing tolerances of the blade width, as measured between the non-cutting edges of the blade, to the width of the blade pocket. This mismatch must be less than the screwhole clearance stated above. A final point to be noted herein is that although as shown in FIG. 6 of the drawings, the reaction against the blade in the vicinity of the pivot is taken up by the blade pocket, if so desired the pivot bolt itself could without departing from the essence of the invention be made to take up the load against the blade.

Although two embodiments of straight pattern snips constructed in accordance with the present invention have been shown in the drawings and described hereinabove, it is to be understood that modifications in the construction thereof may still be made thereto by those skilled in the art without departing from the essence of the invention. In this connection, some of the modifications which can be made in the snips 10 have been alluded to hereinabove while others will become readily apparent to those skilled in the art when exposed to the present description and illustration of the construction of the snips 10. Consequently, the appended claims are intended to cover all equivalent constructions which fall within their true spirit and scope.

Therefore, it can be seen that the present invention provides a novel and improved construction for straight pattern snips operable for cutting a piece of material such as sheet metal. Moreover, in accord with the present invention straight pattern snips have been provided wherein the ears formed in the handle portions thereof are skewed, i.e., rotated out of the major plane of the body of the handle portions to provide a comfortable hand grip for the user while employing the snips. The snips of the present invention are further advantageously characterized by the fact that the blades are detachably mounted thereon. Also, in accord with the present invention straight pattern snips have been provided which in addition to possessing the capability of providing a comfortable grip and embodying detachable blades is moreover advantageously characterized by the fact that the blades are inclined whereby to provide the snips with a more effective and efficient cutting action. Finally, the straight pattern snips of the present invention embody a construction which is capable of being easily and economically manufactured, while yet possessing a relatively long and trouble-free operating life.

We claim:
1. A pair of straight pattern snips comprising:
 a. a first member including a handle portion provided at one end thereof and a jaw portion provided at the other end thereof, said handle portion having a body portion and an ear portion skewed relative to the plane of said body portion to provide a comfortable hand hold for the user, said jaw portion having a blade pocket formed therein provided by a recess extending along one longitudinal edge and providing an elongated shoulder spaced from said longitudinal edge, said recess having a bottom surface sloping inwardly from said handle portion towards the outer end of said jaw portion;
 b. a second member including a handle portion provided at one end thereof and a jaw portion provided at the other end thereof, said handle portion of said second member having body portion and an ear portion skewed relative to the plane of said body portion and in the same direction as said skewed ear portion of said first member and cooperating therewith to provide a comfortable hand hold for the user, said jaw portion of said second member having a blade pocket formed therein provided by a recess extending along one longitudinal edge adjacent said one longitudinal edge of said first member and providing an elongated shoulder spaced from said longitudinal edge, said recess having a bottom surface sloping upwardly from said handle portion towards the outer end of said jaw portion;
 c. pivot means received in said first and second members for operatively connecting together said first and second members for pivotal movement of said longitudinal edges of said jaw portions relative to each other between an open and a closed position;
 d. blade members supported in said blade pockets of each of said first and second members upon said inclined bottom surface thereof with a cutting edge extending longitudinally thereof beyond the said longitudinal edge of said jaw portion so as to be inclined upwardly from said handle portion and towards the other blade member whereby the blade set of said blade member is obtained from the inclined bottom surface of said recess and said cutting edge of one blade member abuts the surface of the blade member of the other member, each of said blade members having an elongated non-cutting edge spaced from said cutting edge and abutting said shoulder; and
 e. fastening means for securing each of said blade members in said blade pocket of the cooperating one of said first and second members against movement therewithin.

2. The pair of straight pattern snips as set forth in claim 1 wherein said first member is provided with a circular hole formed therein intermediate the ends thereof, said second member is provided with a rectangular opening formed therein intermediate the ends thereof and alignable with said circular hole in said first member, and said pivot means comprises a pivot bolt having a circular body received in said circular hole of said first member and a rectangular portion received in said rectangular opening of said second member.

3. The pair of straight pattern snips as set forth in claim 1 wherein each of said blade means has a pair of spaced counterbored openins provided therein intermediate the ends thereof.

4. The pair of straight patterns snips as set forth in claim 3 wherein said blade pocket formed in said jaw portion of each of said first and second members is further defined by an elongated side wall extending from a point on said one longitudinal edge toward said handle portion in spaced relation to said shoulder of said pocket and an end wall adjacent said handle portion extending between said shoulder and said elongated side wall, a portion of said cutting edge of said blade member abutting against said elongated side wall of said blade pocket.

5. The pair of straight pattern snips as set forth in claim 3 wherein said jaw portions of each of said first and second members have a spaced pair of threaded openings formed therein at said pocket thereof alignable with said pair of counterbored openings formed in a corresponding one of said pair of blade members, and said fastening means comprises a pair of threaded fasteners passed through said pair of counterbored openings formed in said blade member and threadedly engaged in said pair of threaded openings at said blade pocket.

6. The pair of straight pattern snips as set forth in claim 1 wherein said handle portions of each of said first and second members further include aligned projections formed integrally therewith and extending towards each other for engagement thereof as stops limiting the extent of movement of said first and second members when said first and second members are moved relative to each other towards the closed position thereof.

7. The pair of straight pattern snips as set forth in claim 1 wherein at least one of said pair of blade members further includes guide means provided adjacent said cutting edge thereof operable for pushing aside the cut edge of the material being severed by the snips and causing the cut edge of the material to slide easily thereover without establishing a force retarding the passage of the snips through the material.

8. The pair of straight pattern snips as set forth in claim 7 wherein said guide means comprises a curvilinear edge portion extending from said cutting edge of said one of said pair of blade members towards said handle portion.

\* \* \* \* \*

UNITED STATES PATENT AND TRADEMARK OFFICE
CERTIFICATE OF CORRECTION

PATENT NO. : 3,971,131
DATED : July 27, 1976
INVENTOR(S) : ALFRED Z. BOYAJIAN ET AL It is certified that error appears in the above-identified patent and that said Letters Patent are hereby corrected as shown below:

Column 11, line 52, "inwardly" should be --upwardly--;

Column 12, line 38, "openins" should be --openings--.

Signed and Sealed this

Thirtieth Day of November 1976

[SEAL]

Attest:

RUTH C. MASON
*Attesting Officer*

C. MARSHALL DANN
*Commissioner of Patents and Trademarks*